United States Patent [19]
Giocastro et al.

[11] Patent Number: 4,622,932
[45] Date of Patent: Nov. 18, 1986

[54] V-CRANKARM

[76] Inventors: Joseph Giocastro; Peter Giocastro; James Giocastro, all of 6428 Metropolitan Ave., Middle Village, N.Y. 11379

[21] Appl. No.: 519,106

[22] Filed: Aug. 2, 1983

[51] Int. Cl.[4] ............................................. F02B 75/06
[52] U.S. Cl. ...................... 123/192 R; 123/197 AC; 74/596
[58] Field of Search ........ 123/197 AC, 197 R, 192 B, 123/192 R, 197 AB; 74/603, 604, 595, 599, 596

[56] References Cited

U.S. PATENT DOCUMENTS

| | | | |
|---|---|---|---|
| 163,390 | 5/1875 | Miller | 74/603 |
| 794,783 | 7/1905 | Cole et al. | 74/603 |
| 1,038,541 | 9/1912 | Ducker | 123/192 R |
| 1,275,140 | 10/1918 | Dunn | 74/603 |
| 1,303,000 | 5/1919 | Weinhardt | 74/603 |
| 1,322,579 | 11/1919 | Kenen | 74/596 |
| 1,351,417 | 8/1920 | Dodge | 74/603 |
| 1,355,439 | 10/1920 | Weinhardt | 74/603 |
| 1,661,341 | 3/1978 | Oldson | 74/603 |
| 1,722,950 | 7/1929 | Barkeij | 74/596 |
| 1,881,027 | 10/1932 | Manning | 74/596 |
| 1,923,808 | 8/1933 | Barkeij | 74/596 |

FOREIGN PATENT DOCUMENTS

| | | | |
|---|---|---|---|
| 1902428 | 10/1970 | Fed. Rep. of Germany | 123/197 AC |
| 678677 | 9/1952 | United Kingdom | 123/197 R |

*Primary Examiner*—Craig R. Feinberg
*Assistant Examiner*—David A. Okonsky
*Attorney, Agent, or Firm*—Joseph Giocastro Presta & Aronson

[57] ABSTRACT

A V-shaped crankarm so arranged, constructed, and mounted that when the piston and piston pin are at top dead center and the greatest resistance to the downstroke is made by the crankarm, the V-crankarm will affect the resistance to the downstroke and transfer the power of the downstroke to rotation of the crankarm and the crankarm.

1 Claim, 8 Drawing Figures

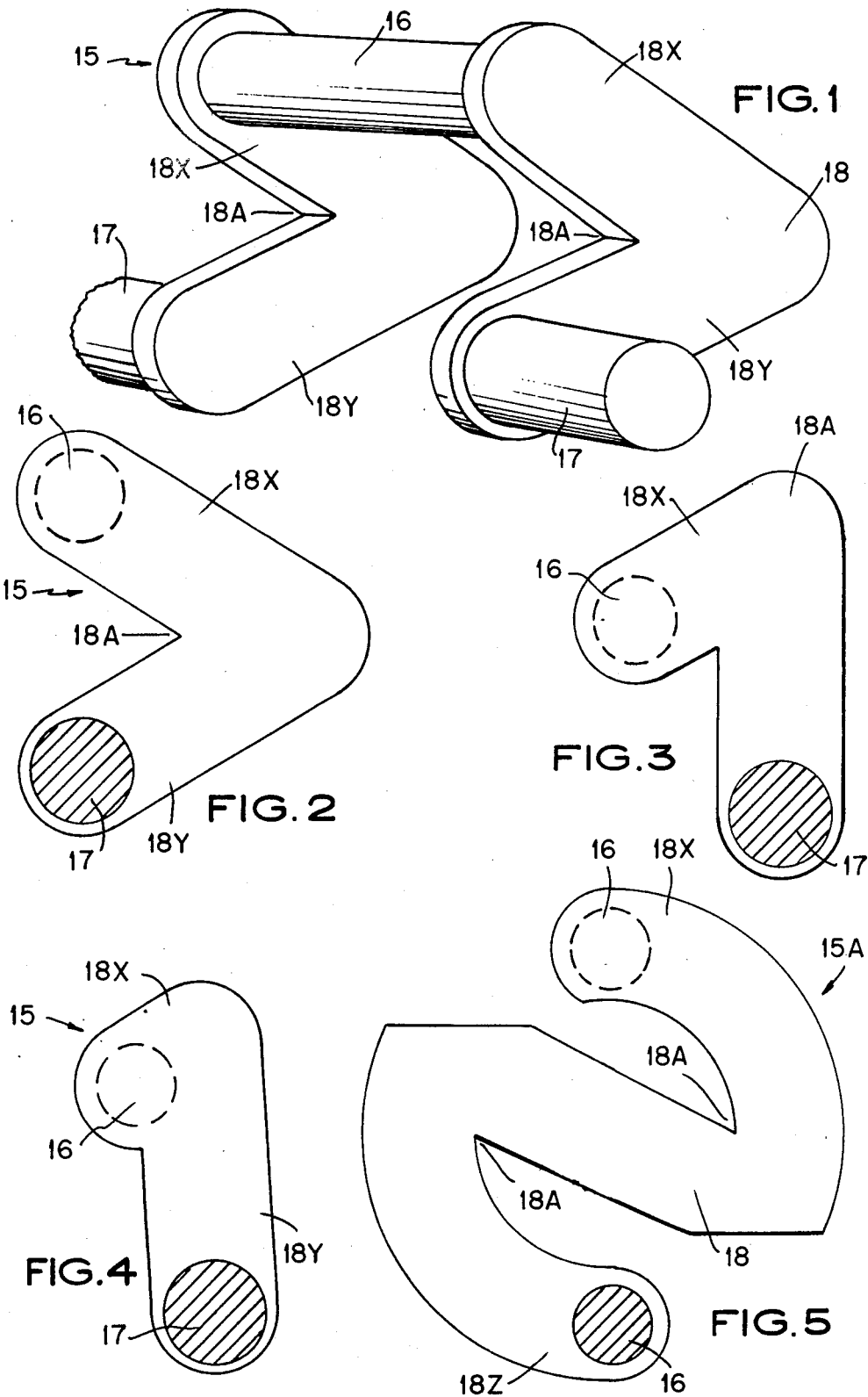

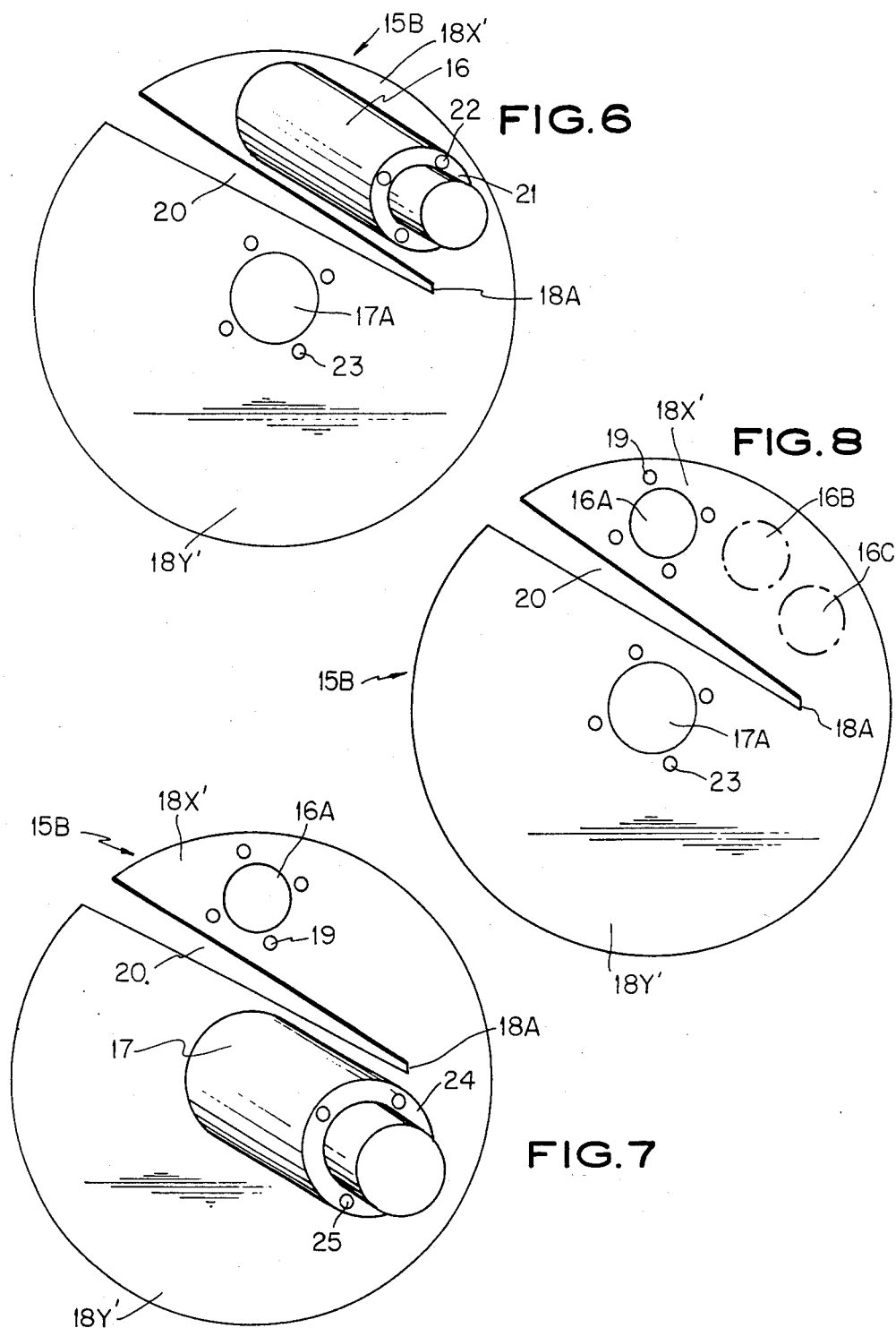

V-CRANKARM

This invention relates to engines and more particularly to a V-crankarm. The invention is directed to improving engine performance and to increasing the power output of an engine without adding to the total weight of the engine and without significantly increasing the manufacturing cost.

The engine crankshaft is often regarded as the backbone of an engine; it serves to change the reciprocating motion of the piston into rotary motion

SUMMARY OF THE INVENTION

An object of my invention is to provide an offset, V-shaped, crankarm so arranged and constructed and mounted that, when the piston pin is top dead center, the power of the piston will be directed to the center of the "V" of the crankarm at an angle from top dead center.

Another object of the invention is directed to a four-cycle reciprocating internal combustion engine that directs the top-dead center power stroke to an angle off of the vertically downward stroke.

Another object of my invention is to provide a circular "S" form of a crankarm so arranged and constructed that one end of the circular S is secured to the connecting rod pin and the other end of the S is a weight to balance the crankshaft so as to direct the dead center power stroke away from dead center.

Another object of my invention is a circular "S" form of a crankarm so arranged and constructed that both ends of the S are secured to pins, one pin being on the top of one side and another pin being on the bottom of the opposite side of the S crankarm, thus allowing the crankarm to rotate more freely.

Another object of my invention is a "V" crankarm configured in varied angles, lengths of the V-arms of the crankarm.

Another object of my invention is to improve the volumetric efficiency of a four-cycle internal combustion engine by providing a "V" shaped crankarm, so that shock is absorbed by the crankarm and impact loads transmitted by the piston are cushioned.

My invention includes a V-crankarm, a circular S crankarm, and a circular V crankarm, all of which will be referred to by the term "V-crankarm".

BRIEF DESCRIPTION OF THE DRAWINGS

FIG. 1 is a perspective view of a V-crankarm according to the present invention showing the crankshaft and crankpins for a one to an eight cylinder engine;

FIG. 2 is a sectional side view of a modified V-crankarm shown in its simplest form with the crankpin arms at about 60 degrees relative to one another;

FIG. 3 is a sectional side view of a V-crankarm with the crankpin arm nearest the piston shorter than the other crankpin arm;

FIG. 4 is a sectional side view of a V-crankarm with the crankpin arm nearest the piston relatively short as compared to the other crankarm;

FIG. 5 is a sectional side view of the V-crankarm having an S-crankarm arrangement;

FIG. 6 is a perspective view of a V-crankarm having a circular arm arrangement showing the crankpin;

FIG. 7 is a perspective view of a V-crankarm having a circular arm arrangement showing the crankarm; and FIG. 8 is a perspective view of a V-crankarm having a circular arm arrangement having openings for adjusting the angle of the crankpin.

DETAILED DESCRIPTION OF THE INVENTION

Reference is now made in detail to the drawings.

In the embodiments that are to be described, it is to be understood that suitable parts such as shims, keys, keyways, nuts and bolts, and other means of fasteners are used at points where they are needed or are desirable, but in the drawings they have not been shown in all the places where they are used.

FIGS. 1 and 2 illustrate a V-crankarm system 15 having a crankpin 16 attached at one end of V-crankarm system 15 and a crankshaft 17 attached to the other end of V-crankarm system 15. V-crankarm system 15 includes a pair of V-arms 18X and 18Y that are joined by crankpin 16, which is connected in a known manner to the engine portion. Crankshaft 17 likewise is a pair of oppositely positioned crankshafts that extend outwardly from the other ends of paired V-arms 18X and 18Y of V-crankarm system 15. Crankarm system 15 transforms the power received from the piston on its power stroke to the mid-area of the V of V-arms 18X and 18Y from where the power is translated, or transmitted, to crankshaft 17. First pair of crankpin arms 18X are connected to crankpin 16 and second pair of crankshaft arms 18Y are connected to crankshaft 7. Arms 18X and 18Y meet at a V intersection 18A.

The power stroke of the piston will be transmitted at a slight forward movement of crankarm 15 at the downstroke of crankpin 16 relative to crankshaft 17 in the present invention because of the angle between arms 18X and 18Y, thus reducing the resistance ordinarily encountered at this point of the power stroke in the prior art. As seen in FIG. 2, the angle between arms 18X and 18Y is about 60 degrees, but this angle may vary in accordance with such factors as strength of the material used. The relative lengths of the crankshaft arm 18X and 18Y, and so on. FIG. 3 illustrates a modification of V-crankarm system 15 shown in FIGS. 1 and 2. V-crankarm system 15 here includes a crank pin 16 extending between crankpin arms 18X and a crankshaft 17 extending between crankshaft arms 18Y. Here, crankpin arm 18X is shorter than crankshaft arm 18Y.

FIG. 4 illustrates another modification of V-crankarm 15 system shown in FIGS. 1 and 2. V-crankarm system 15 here includes a crankpin 16 extending between crankpin arm 18X and a crankshaft 17 extending between crankshaft arms 18Y. Here, crankpin arm 18X is shorter than crankshaft arm 18Y of FIGS. 1 and 2 and even shorter than crankshaft arm of FIG. 3.

FIG. 5 illustrates a modified circular S-crankarm system 15A that is an interior crankarm for a multiple cylinder engine. In its simplest form S-crankarm system 15A is a V crankarm 15 according to the present invention modified to the circular S.

A pair of crankpins 16 are connected to the ends of a pair of crankpin arms 18X and 18Z that are the opposed outer elements of S-crankarm system 15. A crankshaft 17 is seen at the center of S-crankarm system 15. Crankshaft 17 is not mounted to S-crankarm system 15A, although it is driven by S-crankarm system 15A by way of an adjoining V-crankarm (not shown). Connecting arm 18Y extends between and connects the inner portions of crank pin arms 18X and 18Z. Arms 18X and 18Y and 18Y and 18Z intersect at V-type connections 18Z.

FIGS. 6, 7 and 8 illustrate a circular crankarm system 15B embodied as a metal flywheel. Crankarm system 15B is divided by a V-cut 20 into crankshaft sections 15A and 15B. Crankpin openings 16A, 16B and 16C formed through section 15A of FIG. 8 are each adapted to hold crankpin 16 at varied length of the crankpin arm portion nearest the piston. Openings 16B and 16C are shown in phantom. A crankshaft opening 17A is also shown in FIGS. 6 and 8 at the center of crankarm system 15, in particular in crankshaft section 15B. FIG. 6 shows crankpin 16 mounted with crankpin hole 16A. A crankpin boss 21 extends outwardly from pin 16.

Bolt taps 19 are formed around crank pin hole 16A (and 16B and 16C). Bolt taps 22 are formed by crankpin 16 at its flange with crankpin boss 21, which in turn is adapted to fit into holes 16A, 16B, or 16C. Bolt taps 19 and 22 are aligned for receipt of common bolts. FIGS. 6 and 8 show bolt tap holes 23 formed around center crankshaft hole 17A.

FIG. 7 illustrates crankshaft 17 positioned in crankshaft hole 17A. A crankshaft boss 24 extends from the end of crankshaft 17. Boss 24 is adapted to fit into crankshaft hole 17A. Crankshaft taps 25 formed around crankshaft 17 are aligned with bolt taps 23 for mounting by common bolts.

In the embodiment of FIGS. 6, 7, and 8, crankshaft section 18X' is analagous to crankpin arm 18X and crankshaft section 18Y' is analogous to crankpin arms 18Y. Thus, power from crankpin 16 is transmitted to crankshaft 17 at a power angle that directs the power stroke somewhat forward of the direct line of force between the crankpin and the crankshaft current in the art.

It is to be understood that the invention is not to be limited to the embodiments herein set forth, but that the various modifications and changes that will occur to persons skilled in the art are to be regarded as being within the scope of the invention and as defined by the appended figures.

We claim:

1. A crankarm system for translating a force of a piston of an internal combustion engine into rotating a crank shaft, comprising, in combination:
   a crank pin connected to said piston,
   a crankarm, said crankarm having a crank pin arm portion and a crank shaft arm portion, said crank pin arm portion having a crank pin end connected to said crank pin and an opposed connecting end, said crank shaft arm portion having a crank shaft end portin and an opposed connecting end, said crank pin arm portion and said crank shaft arm portion being connected at a first angle at said connecting ends,
   said crank arm also having another crank pin arm portion and another crank shaft arm portion, said another crank pin arm portion having a crank pin end and opposite connecting end and said another crank shaft arm portion having a crank shaft end portion and an opposite connecting end opposed to said crank shaft end portion, said another crank pin arm portion being connected to said another crank shaft arm portion at an angle equal to said first angle and at said opposite connecting ends of another crank pin arm portion and said another crank shaft arm portion, wherein said crankarm is configured in a shape of an S, with said crank pin arm portion and said another crank pin arm portion being opposed arcurate end elements of said S and said crank shaft arm portion and said another crank shaft arm portion being a diametrical connecting element of said S.

* * * * *